(12) United States Patent
Clark

(10) Patent No.: US 7,660,788 B1
(45) Date of Patent: Feb. 9, 2010

(54) MAPPING PART NUMBERS AND OTHER IDENTIFIERS

(75) Inventor: Gregory Scott Clark, Hillsborough, CA (US)

(73) Assignee: E2open, Inc., Foster City, CA (US)

( * ) Notice: Subject to any disclaimer, the term of this patent is extended or adjusted under 35 U.S.C. 154(b) by 372 days.

(21) Appl. No.: 10/664,800

(22) Filed: Sep. 19, 2003

Related U.S. Application Data

(60) Provisional application No. 60/473,093, filed on May 23, 2003.

(51) Int. Cl.
*G06F 7/00* (2006.01)

(52) U.S. Cl. .............................. 707/4; 705/28

(58) Field of Classification Search ...................... 707/1, 707/3, 4, 7, 102; 705/26, 28, 29
See application file for complete search history.

(56) References Cited

U.S. PATENT DOCUMENTS

| | | | |
|---|---|---|---|
| 6,115,690 | A | 9/2000 | Wong |
| 6,324,522 | B2 * | 11/2001 | Peterson et al. ............... 705/28 |
| 6,950,826 | B1 * | 9/2005 | Freeman ..................... 707/102 |
| 2002/0055886 | A1 * | 5/2002 | Hinckley ..................... 705/26 |
| 2002/0188528 | A1 * | 12/2002 | Adelman et al. .............. 705/28 |
| 2003/0036968 | A1 * | 2/2003 | Ouchi ......................... 705/26 |
| 2003/0101168 | A1 * | 5/2003 | Chow et al. ................... 707/3 |
| 2003/0115115 | A1 * | 6/2003 | Ouchi ......................... 705/27 |
| 2003/0172051 | A1 * | 9/2003 | Ouchi ........................... 707/1 |

FOREIGN PATENT DOCUMENTS

| WO | WO 02/080042 A1 | 10/2002 |
|---|---|---|
| WO | WO 03/030063 A1 | 4/2003 |
| WO | WO 03/030065 A1 | 4/2003 |

OTHER PUBLICATIONS

Descartes.com. "Inventory Demand Matcher." 2001, The Descartes Systems Group Inc., pp. 1-2.

* cited by examiner

*Primary Examiner*—Cheyne D Ly
(74) *Attorney, Agent, or Firm*—Swernofsky Law Group PC

(57) ABSTRACT

The invention provides a technique to prevent confusion between part numbers used by different suppliers and manufacturers. The invention includes a database that (1) creates an association between part numbers that are directed to comparable parts, (2) generates a universal number for comparable parts, and (3) creates an association between the part numbers and the universal part. This set of associations is used to generate documents that include part numbers that the recipient of the document is familiar with. Limitations are placed on what authorities may provide information about a set of associations. Generally, only the supplier of a part or the supplier of a comparable part may create associations between their parts. This limitation helps maintain the integrity of information in the database. This database is coupled to a shared service network such as a hub for design collaboration or supply chain control.

11 Claims, 3 Drawing Sheets

MAPPING PART NUMBERS AND OTHER IDENTIFIERS

This application claims the benefit of U.S. Provisional Application No. 60/473,093 filed May 23, 2003 hereby incorporated by reference.

BACKGROUND OF THE INVENTION

1. Field of the Invention

This invention relates to associating part numbers from multiple vendors with a universal part number for use in a collaborative tracking network.

2. Related Art

For ease in record keeping, it has become customary for a seller to use an alphanumeric code to precisely identify a particular good. It is generally recognized that such systems provide information more efficiently and accurately than verbal descriptors directed to the nature of an item. One such system that has come into almost universal use involves stock keeping numbers (SKUs). Sellers can generally evaluate their inventory by referring to SKU numbers without resort to verbal descriptors.

One drawback to alpha-numeric codes is that persons interested in buying a product may not be familiar with the code. For this reason, such alpha-numeric codes are not commonly used in marketing, sales or in most non-electronic transactions. If used at all in such contexts, the alpha-numeric code is for the benefit of the seller, not the buyer.

One solution to this problem is to use an additional verbal description of a good. For example, when ordering an auto part, it is useful to refer to both the part name as well as the part number. This combined use of a verbal descriptor and alphanumeric code minimizes confusion on the part of the both the seller and the buyer: the verbal descriptor provides a degree of certainty for the buyer (especially those buyers who are relatively unfamiliar with buying auto parts) and the alpha-numeric identifier streamlines record keeping for the seller.

Use of additional verbal description is not always possible however—either because the additional verbiage creates confusion or because it is not conventional to use it. For example, in many industries, including the electronics industry, it is customary to refer to a part solely by a part number. In such instances, the confusion that results from using just a part number is compounded when many different manufacturers make identical or similar parts and each manufacturer uses a different alpha-numeric code to identify the part. Under these circumstances, a seller may generate a BOM (bill of manufacture) or a PO (purchase order) (PO) that is not understood by the recipient of the document. This practice makes it difficult to compare the actual product ordered with the documentation that accompanies it. The problem is further compounded during the billing process because it is unclear what materials a bill refers to.

The need for a system of part numbers that is easily understood is particularly critical in electronic systems for collaborative design and supply chain management. Such systems may include numerous entities that produce similar parts, but identify them differently. Accordingly, it would be desirable to provide a technique for mapping part numbers from multiple vendors that is not subject to the drawbacks of the known art.

SUMMARY OF THE INVENTION

The invention includes a method and system for mapping part numbers and other identifiers for design collaboration and supply chain management in a networking environment.

In a first aspect of the invention, a database (1) creates an association between part numbers that are directed to comparable parts, (2) generates a universal part number for comparable parts, and (3) creates an association between the part numbers and the universal part number. For example, Mega-Corp produces 12-microfarad capacitors and identifies them using alpha-numeric "xo12345x.1.1". Giganto Inc. also produces 12-microfarad capacitors of comparable quality and identifies them using alpha-numeric PF9876.3. A universal number is generated such that it may be used to refer to both xo12345x.1.1 and PF9876.3. An association is created between the part numbers and the universal part number such that when information is sent to an entity in a supply chain, the information includes a number that the entity is familiar with. This set of associations helps present part-number mismatches and clarifies communications between parties.

In a preferred embodiment, the database includes a set of associations between compatible parts. This set of associations is particularly useful determining which parts can be used to fill a particular order.

In other embodiments, the set of associations may include associations between different job titles that are used for comparable jobs. This is particularly useful for entities that supply workers to a work site. For example, a hazmat technician level 1 may be variously identified as an entry-level field safety chemist, a safety tech officer or some other job title. In these other embodiments, a universal number may be generated and a set of associations may be drawn between each comparable job title and the universal number. This set of associations may be used to benefit prospective employers, prospective employees and employment agencies.

In a second aspect of the invention, limitations are placed on what authorities may provide information about a set of associations. These limitations are implemented by a management interface that manages data in the database. Generally, only the supplier of a part or the supplier of a comparable part may create associations between their parts. This limitation helps maintain the integrity of information in the database.

In a preferred embodiment, this database is coupled to a shared service network such as a hub for design collaboration or supply chain control. In such embodiments, the database is coupled to a gateway to that used to translate BOMS and other documents into a format that is readily understood by the recipient of the document. This prevents confusion and ensures that transactions conducted by way of the system coupled to the database are readily comprehensible to all parties.

DETAILED DESCRIPTION OF THE PREFERRED EMBODIMENT

In the following description, a preferred embodiment of the invention is described with regard to preferred process steps and data structures. Those skilled in the art would recognize after perusal of this application that embodiments of the invention can be implemented using one or more general purpose processors or special purpose processors or other circuits adapted to particular process steps and data structures described herein, and that implementation of the process steps and data structures described herein would not require undue experimentation or further invention.

Related Applications

Inventions described herein can be used in conjunction with inventions described in the following application(s):

application Ser. No. 09/823,888, filed in the name of inventor Greg Clark, titled "Private Collaborative Planning in a Many-to-Many Hub", filed on Mar. 30, 2001, and assigned to the same assignee, now U.S. Pat. No. 6,823,340.

This application is hereby incorporated by reference as if fully set forth herein.

Lexicography

As used herein, use of the following terms refer or relate to aspects of the invention as described below.

Universal number—as used herein, a "universal number" refers to an identifier that is used by design collaboration systems, supply chain management systems or other shared service networks to identify a particular part.

Translator—as used herein, a "translator" is an engine that refers to a database that includes proprietary part numbers and universal numbers and converts them from one numbering scheme to another so as to provide a user with a more familiar numbering scheme.

Management module—as used herein, a "management module" controls who has the authority to enter part numbers into the database and assign universal numbers.

These descriptions of these terms are not intended to be limiting, only illustrative. Other and further applications of the invention, including extensions of these terms and concepts, would be clear to those of ordinary skill in the art after perusing this application. These other and further applications are part of the scope and spirit of the invention, and would be clear to those of ordinary skill in the art, without further invention or undue experimentation.

System Elements

Figure 1:
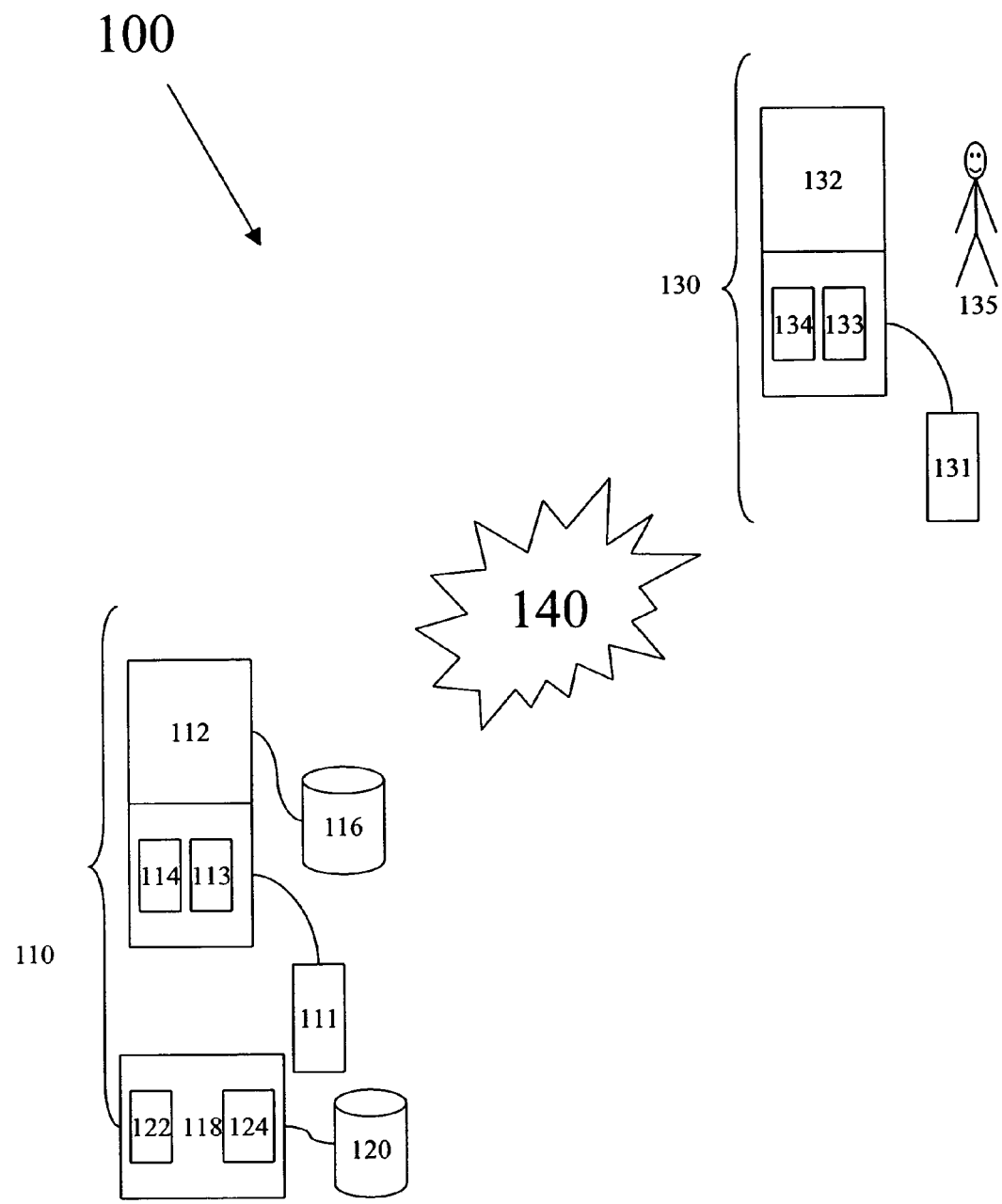
FIG. 1 shows a block diagram of a system for mapping part numbers and other identifiers as used in a design collaboration and supply chain network.

FIG. 1 shows a block diagram of a system for mapping part numbers and other identifiers as used in a design collaboration and supply chain network.

A system for mapping part numbers and other identifiers as used in a design collaboration and supply chain network (shown by general character reference 100) includes one or more dedicated servers 110, a set of client workstations 130 and a network 140.

Each of the one or more dedicated servers 110 includes an input element 111, a presentation element 112, a local memory 113, web server software 114, a first database 116 for storing information relevant to transactions conducted at the web, and a parts module 118.

The web server software 114 is used to generate a series of web pages dedicated to providing a technique for commercial supply chain management, design collaboration and other business transactions that involve the acquisition and sale of parts, components and other fungible goods. Additional software is used to execute such transactions.

The first database 116 includes information regarding trading partners, available goods, trading preferences, design projects and other information such as necessary to conduct commerce.

The parts module 118 includes a second database 120, a management module 122, and a translation module 124. The second database 120 includes all of the part numbers that have been used or are likely to be used by all trading partners. The management module 122 includes a rule base governing who may add information to the second database 120 and a technique for managing information therein. The translation module 124 includes a technique for receiving a document (such as a purchase order) that includes one set of part numbers, translating that set of part numbers to a different set of numbers that are meaningful to a supplier of those parts, and generating a BOM on behalf of a particular party that includes a set of part numbers that are meaningful to the recipient of the BOM. This translation module may be used to translate part numbers on other documents such as bills of lading, shipping receipts, bills, back order documents and any other such documents that include part numbers.

Although preferably stored at the one or more servers 110, the parts module 118, second database 120, management module 122 and translation module 124 may be stored in any location that is logically local to the one or more servers 110.

A preferred embodiment of the one or more servers 110 includes a general-purpose computer, such as a laptop or workstation. However, one or more of the servers 10 can 1 also include (either alone or in conjunction with a laptop or workstation), a personal digital assistant (such as a "Palm Pilot" or other hand-held device), a portable computer, a special purpose computer, a cellular telephone or other telephonic device or another device. In alternative embodiments, the one or more servers 110 may also include any other device disposed for performing the all or some functions described herein.

Additional description of the web server and the activities provided thereby is provided in patent application Ser. No. 09/823,888 in the Incorporated Disclosures (now U.S. Pat. No. 6,823,340).

Each client workstation included in the set of client workstations 130 includes an input element 131, a presentation element 132, a local memory 133 and a network interface 134. Each client workstation in the set of workstations 130 is under the control of a user 135 who wishes engage is design collaboration, supply chain management, place an order for parts or engage in any other transaction with the one or more dedicated servers 110.

Similar to the one or more dedicated servers 110, each client workstation included in the set of client workstations 130 includes a general-purpose computer, such as a laptop or workstation. However, each client workstation can also include (either alone or in conjunction with a laptop or workstation), a hand-held calendar (such as a "Palm Pilot" or other hand-held device), a portable computer, a special purpose computer, a cellular telephone or other telephonic device, a web server acting as the agent for a user, or another device. In alternative embodiments, a client workstation may also include any other device disposed for performing the all or some functions described herein.

The communication network 140 is disposed for communicating data between the one or more servers 110 and the set of client workstations 130. In a preferred embodiment, the communication network 140 includes a packet switched network such as the Internet, as well as (in conjunction with or instead of) an intranet, an enterprise network, an extranet, a virtual private network or a virtual switched network. In alternative embodiments, the communication network 140 may include any other set of communication links that couple the one or more servers 110 and the set of client workstations 130.

Figure 2:
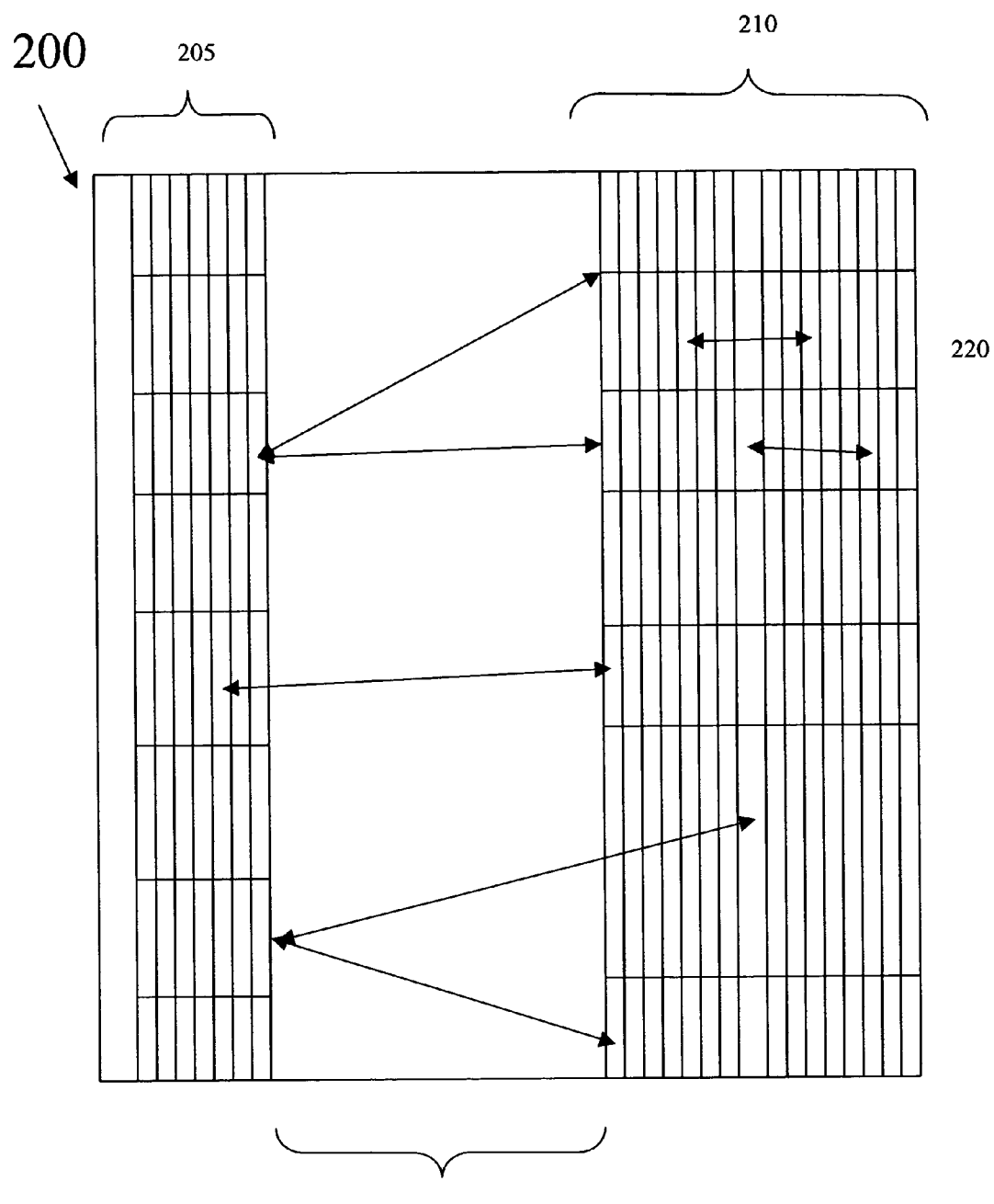
FIG. 2 shows a database structure for a database that is used to map part numbers.

FIG. 2 shows a database structure for use in a database used to map part numbers.

A database structure 200 includes a first set of data fields 205, a second set of data fields 210, a first set of associations 115 and a second set of associations 220. This structure is used in the database 120 that is included in parts module 118.

Each data field included in the first set of data fields 205 has a universal number. In a preferred embodiment, these universal numbers are either numerical or alpha-numerical. In other embodiments, different types of identification schemes may be used, such as schemes that involve symbols. Each universal number included in the first set of data fields 205 is unique. These universal numbers are created and manipulated only by the management module 122.

Each data field included in the second set of data fields 210 includes a proprietary part number. These proprietary part numbers are generally alpha-numerical, but may include any other proprietary identifiers for parts and components such as may be used by a business to identify it's goods. Generally, a new proprietary part number may only be entered into this portion of database 118 according to the rulebase of the management module 122 described above. For example, part numbers associated with a particular division of Engulf & Devour, Inc. must be initially entered by an authority from that division of Engulf & Devour. This practice prevents confusion and maintains the integrity of database 118.

A first set of associations 215 exists between each universal number in the first set of data fields 205 and one or more proprietary part numbers in the second set of data fields 210. These associations may only be created by the management module 122. The associations between the universal number and the proprietary numbers are used to identify identical or approximately identical parts or components.

The purpose of the set of associations 215 is to minimize confusion in ordering, billing, shipping, receiving and other areas of a pertaining to a transaction that involve the use of part numbers.

This first set of associations 215 permits a user (generally, a business involved with the system 100) to generate a purchase order for goods using a set of part numbers that are familiar to them and to receive a BOM that includes numbers with which they are familiar, regardless of what company actually supplied the parts used to fill the order. For example, an order is placed for 500 units of widgets, proprietary part number ED 0001. When the order is received by the system 100, the proprietary part number ED 0001 is translated into a universal number 0000 by the translation module 124. This universal number is associated not only with ED 0001, but with parts comparable to ED 0001 that are made by other manufacturers or sold by different suppliers. The associations are responsive to data input by persons or computer programs such as indicated by the rule base in the management module 122. When the goods are shipped, the BOM includes (among other things) the same proprietary part numbers that the purchaser initially requested, thereby making it easier for workers in receiving to determine whether the order was correctly filled.

The set of associations 220 is includes different relations between data fields in the second set of data fields 210. This set of associations 220 links comparable goods. For example, an association in the set of associations 220 may include links to all 10 ohm resisters. The purpose of this set of associations 220 is to draw parallels between comparable goods. These may reflect individual agreements between particular companies.

Method of Use

Figure 3:
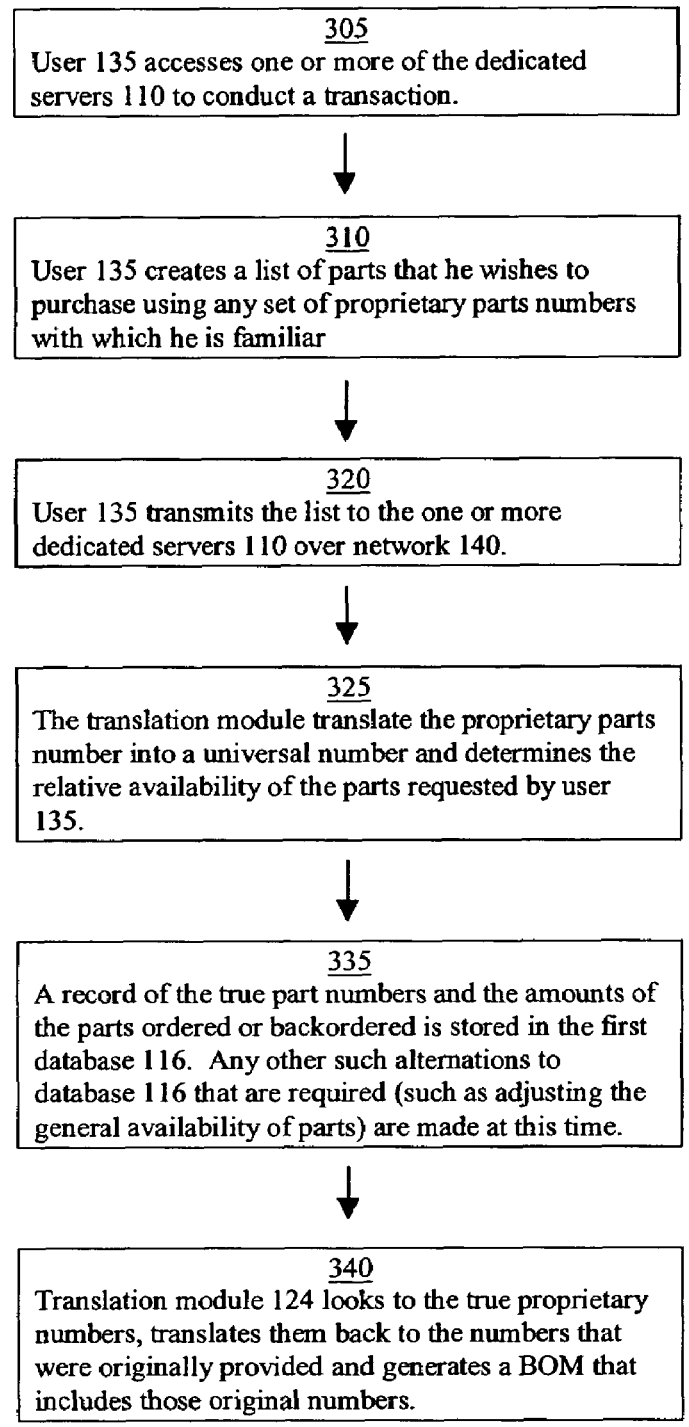
FIG. 3 shows a process flow diagram for a method of mapping part numbers and other identifiers.

FIG. 3 shows a process flow diagram for a method of mapping part numbers and other identifiers.

A method 300 is performed by the system 100 and data structure 200. Although the method 300 is described serially, the steps of the method 300 can be performed by separate elements in conjunction or in parallel, whether asynchronously, in a pipelined manner, or otherwise. There is no particular requirement that the method 300 be performed in the same order in which this description lists the steps, except where so indicated.

In a flowpoint 305, a user 135 uses a client device included in the set of client devices 130 to access one or more of the dedicated servers 110. The user 135 may wish to conduct an activity such as ascertain parts availability, check a parts shipment, order parts or conduct any other activity that involves using a part number. Although this method is directed to ordering a part, other activities involving the parts module 118 are within the scope of the invention.

In a step 310, the user 135 creates a list of parts that he wishes to purchase. This list includes part numbers with which the user 135 is familiar, such as his own part number (that is, if the user 135 is a manufacturer or supplier of the desired part), the part numbers of a frequently used supplier, or the numbers found in an on line catalog, either at this site, other web sites or a mail-order catalog.

In a step 320, the user 135 transmits the list to the one or more dedicated servers 110 over network 140.

In a step 325, software at the one or more dedicated servers 110 determines the relative availability of the parts requested by user 135. This may involve looking to parts from other companies or parts that are identified by other numbers than those specified by the user 135 in step 315. This is done by translating the proprietary part number provided by the user 135 into a universal number and checking what parts are associated with that universal number. In this step, the order is filled using such parts as are available, or from suppliers or manufacturers that the user 135 has a stated preference for.

In a step 335, a record of the true part numbers and the amounts of the parts ordered or backordered is stored in the first database 116. Any other such alternations to database 116 that are required (such as adjusting the general availability of parts) are made at this time.

In a step 340, the translation module looks to the true proprietary numbers and translates them back to the numbers that were originally provided by the user 135 in step 315. The translation module generates a BOM or other such shipping papers or electronic records and transmits the record back to the user 135. In this way the user 135 has a record of the transaction that is readily comprehensible to him. Additional and further information may also be included in this record, such as the manufacturers or suppliers who provided the parts and other billing information.

Generality of the Invention

The invention has general applicability to various fields of use, not necessarily related to generation of start pages as described above. For example, these fields of use can include one or more of, or some combination of, the following:

Associating multiple job titles for comparable positions to a universal job title. This can be used by employment agencies and other entities in which people are categorized by their job.

Associating different business formats with a universal format and translating the universal format into one that is preferred by a user.

This can be used when generating bills and other documents on behalf of a client who desires a particular type of billing format.

ALTERNATIVE EMBODIMENTS

Although preferred embodiments are disclosed herein, many variations are possible which remain within the concept, scope, and spirit of the invention, and these variations would become clear to those skilled in the art after perusal of this application.

The invention claimed is:

1. A method for translating a document that includes a set of proprietary part numbers over a network, including steps of:
receiving a first document including a first set of proprietary part numbers from a client workstation, said first set of proprietary part numbers provided by a user of said client workstation to engage in supply chain management, design collaboration, or the purchase or sale of services or fungible goods;
translating said first set of proprietary part numbers into a set of universal part numbers, wherein said set of universal part numbers is associated with other numbers than the first set of proprietary part numbers, and said other numbers are associated with different suppliers or manufacturers;
determining availability of one or more parts associated with said set of universal part numbers wherein said one or more parts are identified by one or more of said other numbers;
storing in a first database a record of said other numbers and amounts of parts ordered or backordered;
translating said other numbers into at least part of the proprietary part numbers originally provided by the user; and
generating shipping papers or electronic records using the at least part of the proprietary part numbers originally provided by the user translated from the other numbers that summarizes a transaction involving the one or more parts.

2. A method as in claim 1, wherein said steps of translating said first set of proprietary part numbers and said steps of translating said set of other numbers are performed by a translation module that translates one or more proprietary part numbers associated with said first document into different part numbers that the recipient of said shipping papers or electronic records readily understands.

3. A method as in claim 2, wherein said translation module is used to prepare commercial documents.

4. A method as in claim 1, further comprising the step of identifying what parties may create associations between part numbers or enter new part numbers.

5. A memory, including a set of instructions executable by a processor, said set of instructions including instructions for receiving a first document including a first set of proprietary part numbers from a client workstation, said first set of proprietary part numbers provided by a user of said client workstation to engage in supply chain management, design collaboration, or other purchase or sale of services or fungible goods, and wherein each of the proprietary part numbers provided by the user is selected from the group consisting of the user's own part numbers, part numbers of frequently used suppliers, and part numbers found in an on line catalog;
translating said first set of proprietary part numbers into a set of universal part numbers, wherein said set of universal part numbers is associated with other numbers than the first set of proprietary part numbers, and said other numbers are associated with different suppliers or manufacturers;
determining availability of one or more parts associated with said set of universal part numbers wherein said one or more parts are identified by one or more of said other numbers;
storing in a first database a record of said other numbers and amounts of parts ordered or backordered;
translating said other numbers into at least part of the proprietary part numbers originally provided by the user; and
generating shipping papers or electronic records using the at least part of the proprietary part numbers originally provided by the user translated from the other numbers that summarizes a transaction involving the one or more parts.

6. A memory as in claim 5, wherein said instructions for translating said first set of proprietary part numbers and said instructions for translating said set of other numbers further include a translation module that translates one or more proprietary part numbers associated with said first document into different part numbers that the recipient of said shipping papers or electronic records readily understands.

7. A memory as in claim 6, wherein said translation module is used to prepare commercial documents.

8. A memory as in claim 5, wherein said instructions further include instructions for identifying what parties may create associations between part numbers or enter new part numbers.

9. A method as in claim 1, wherein said universal part numbers are numerical, alpha-numerical, or part numbers involving symbols.

10. A memory as in claim 5, wherein said universal part numbers are numerical, alpha-numerical, or part numbers involving symbols.

11. A method as in claim 1, wherein each of the proprietary part numbers provided by the user is selected from the group consisting of the user's own part numbers, part numbers of frequently used suppliers, and part numbers found in an on line catalog.

* * * * *